(12) United States Patent
Yu et al.

(10) Patent No.: US 12,494,510 B2
(45) Date of Patent: Dec. 9, 2025

(54) FLUORINATED DIETHERS AND THE USE THEREOF IN ELECTROLYTES AND BATTERIES

(71) Applicant: FEON ENERGY, INC., Woburn, MA (US)

(72) Inventors: Zhiao Yu, Cambridge, MA (US); Wenxiao Huang, Medford, MA (US); Shaoyang Wang, Malden, MA (US)

(73) Assignee: Feon Energy, Inc., Woburn, MA (US)

( * ) Notice: Subject to any disclaimer, the term of this patent is extended or adjusted under 35 U.S.C. 154(b) by 0 days.

(21) Appl. No.: 18/791,988

(22) Filed: Aug. 1, 2024

(65) Prior Publication Data

US 2025/0316764 A1   Oct. 9, 2025

Related U.S. Application Data

(60) Provisional application No. 63/574,986, filed on Apr. 5, 2024.

(51) Int. Cl.
| | |
|---|---|
| *H01M 10/0569* | (2010.01) |
| *H01M 4/38* | (2006.01) |
| *H01M 10/0568* | (2010.01) |
| *H01M 4/02* | (2006.01) |

(52) U.S. Cl.
CPC ....... *H01M 10/0569* (2013.01); *H01M 4/382* (2013.01); *H01M 10/0568* (2013.01); *H01M 2004/027* (2013.01); *H01M 2004/028* (2013.01); *H01M 2300/0034* (2013.01); *H01M 2300/0037* (2013.01)

(58) Field of Classification Search
CPC .............................. H01M 4/045; H01M 4/29
See application file for complete search history.

(56) References Cited

U.S. PATENT DOCUMENTS

| | | | |
|---|---|---|---|
| 8,372,566 | B1 | 2/2013 | Cote et al. |
| 8,765,340 | B2 | 7/2014 | Vella et al. |
| 8,956,768 | B2 | 2/2015 | Iwaya |
| 11,196,088 | B2 | 12/2021 | Hakari et al. |

(Continued)

FOREIGN PATENT DOCUMENTS

| | | |
|---|---|---|
| CN | 114824489 A | 7/2022 |
| EP | 0267627 A1 | 5/1988 |

(Continued)

OTHER PUBLICATIONS

Machine translation of JP-2004363031-A.*

(Continued)

*Primary Examiner* — Haixia Zhang
(74) *Attorney, Agent, or Firm* — Stites & Harbison, PLLC

(57) ABSTRACT

An electrolyte includes a salt, a first fluorinated diether having a degree of fluorination of 10% to 25%, and a second fluorinated ether having a degree of fluorination of 40% to 100%, wherein the degree of fluorination is determined by dividing a total number of carbon atoms in the first fluorinated diether or the second fluorinated ether, which is substituted with at least one fluoro by a total number of carbon atoms in the corresponding first fluorinated diether or the second fluorinated ether, and wherein the first fluorinated diether and the second fluorinated ether have a volume ratio of 1:4 to 4:1.

12 Claims, 14 Drawing Sheets

(56) References Cited

U.S. PATENT DOCUMENTS

| | | | |
|---|---|---|---|
| 2001/0041294 A1* | 11/2001 | Chu | H01M 4/12 |
| | | | 429/231.95 |
| 2008/0306308 A1 | 12/2008 | Nanno et al. | |
| 2012/0107701 A1 | 5/2012 | Iwaya | |
| 2012/0214073 A1 | 8/2012 | Iwaya et al. | |
| 2014/0141313 A1* | 5/2014 | Takase | H01M 4/131 |
| | | | 429/212 |
| 2014/0350181 A1 | 11/2014 | Tortelli et al. | |
| 2018/0004102 A1 | 1/2018 | Mcguire et al. | |
| 2019/0326639 A1* | 10/2019 | Kinoshita | H01G 11/60 |
| 2020/0036043 A1* | 1/2020 | Ishikawa | H01M 4/38 |
| 2020/0067130 A1 | 2/2020 | Rustomji et al. | |
| 2020/0235420 A1 | 7/2020 | Yushin et al. | |
| 2024/0079653 A1 | 3/2024 | Park et al. | |
| 2024/0106000 A1 | 3/2024 | Choi et al. | |

FOREIGN PATENT DOCUMENTS

| | | | |
|---|---|---|---|
| EP | 3264183 A1 | | 1/2018 |
| JP | H01117838 A | | 5/1989 |
| JP | 2004363031 A | * | 12/2004 |
| WO | 2015051131 A1 | | 4/2015 |
| WO | 2021142249 A1 | | 7/2021 |
| WO | 2024226580 A2 | | 10/2024 |

OTHER PUBLICATIONS

Hideki Ishii et al., "Electrolytic Partial Fluorination of Organic Compounds. Part 41: Highly Selective Electrolytic Fluorination of Dimethoxyethane, its Homologues, and Crown Ethers," Tetrahedron, vol. 56, Issue 45, Nov. 3, 2000, pp. 8877-8881.

Noritoshi Nambu et al., "Physical and Electrochemical Properties of Fluorinated Dialkyl Ethers," Electrochemistry, 84 (10), 776-778 (2016).

T. Satoh et al., "Physical and Electrolytic Properties of Trifluorinated Linear Ethers and Their Application to Lithium Secondary Batteries," Electrochemistry, 50 (48) 127-144 (2013).

Ue et al."Nonaqueous Electrolytes with Advances in Solvents": Modern Aspects of Electrochemistry, vol. 58, Jan. 1, 2014: pp. 93-165.

Zhang et al: "Amonofluoride ether-based electrolyte solution for fast-charging and low temperaturen on-aqueous lithium metal batteries" Nature Communications: vol. 14: 25: Feb. 2023: pp. 1-13.

Written Opinion for PCT Application No. PCT/US2025/022895 filed Apr. 3, 2025; Date of Mailing Jul. 15, 2025.

* cited by examiner

FLUORINATED DIETHERS AND THE USE THEREOF IN ELECTROLYTES AND BATTERIES

CROSS-REFERENCE TO RELATED APPLICATIONS

This application claims priority to U.S. Application Ser. No. 63/574,986, filed Apr. 5, 2024, the content of which is incorporated herein by reference in its entirety.

FIELD

The present disclosure relates generally to fluorinated diethers, and more specifically to fluorinated diethers and the use thereof in electrolytes and electrochemical cells.

BACKGROUND

As lithium-ion batteries are approaching their capacity limit, advanced battery technologies are needed to fulfill the need of high energy density applications such as electric vehicles and electric aviation. Driven by the demand, advancements in battery technology continue to emerge. For example, lithium (Li) metal, having a theoretical capacity of 3860 mAh/g, and silicon-based anodes, having a capacity up to 4200 mAh/g, are under intensive research to improve on graphite as an anode material in Li-ion batteries. However, commonly used carbonate electrolytes for Li-ion batteries are not compatible with these advanced chemistries. Continuous side reactions between lithium metal or silicon anode materials, and carbonates, can lead to the formation of lithium dendrites, or anode particle pulverization, loss of active lithium reservoir, or depletion of electrolytes, reflected by low columbic efficiency (CE) or undesirable capacity decay. Thus, there remains a need for improved electrolytes that can provide improved cycling performance when used with Li metal or silicon anode materials.

SUMMARY

An electrolyte includes a salt, a first fluorinated diether having a degree of fluorination of 10% to 25%, and a second fluorinated ether having a degree of fluorination of 40% to 100%, wherein the degree of fluorination is determined by dividing a total number of carbon atoms in the first fluorinated diether or the second fluorinated ether, which is substituted with at least one fluoro by a total number of carbon atoms in the corresponding first fluorinated diether or the second fluorinated ether, and wherein the first fluorinated diether and the second fluorinated ether have a volume ratio of 1:4 to 4:1.

An electrochemical cell includes an anode; a cathode; and the above-described electrolyte.

A method of preparing an electrochemical cell includes providing the above-described electrolyte; and adding the electrolyte to an assembly comprising a cathode and an anode, to manufacture the electrochemical cell.

BRIEF DESCRIPTION OF THE DRAWINGS

The following descriptions should not be considered limiting in any way.

DETAILED DESCRIPTION

Figure 1:
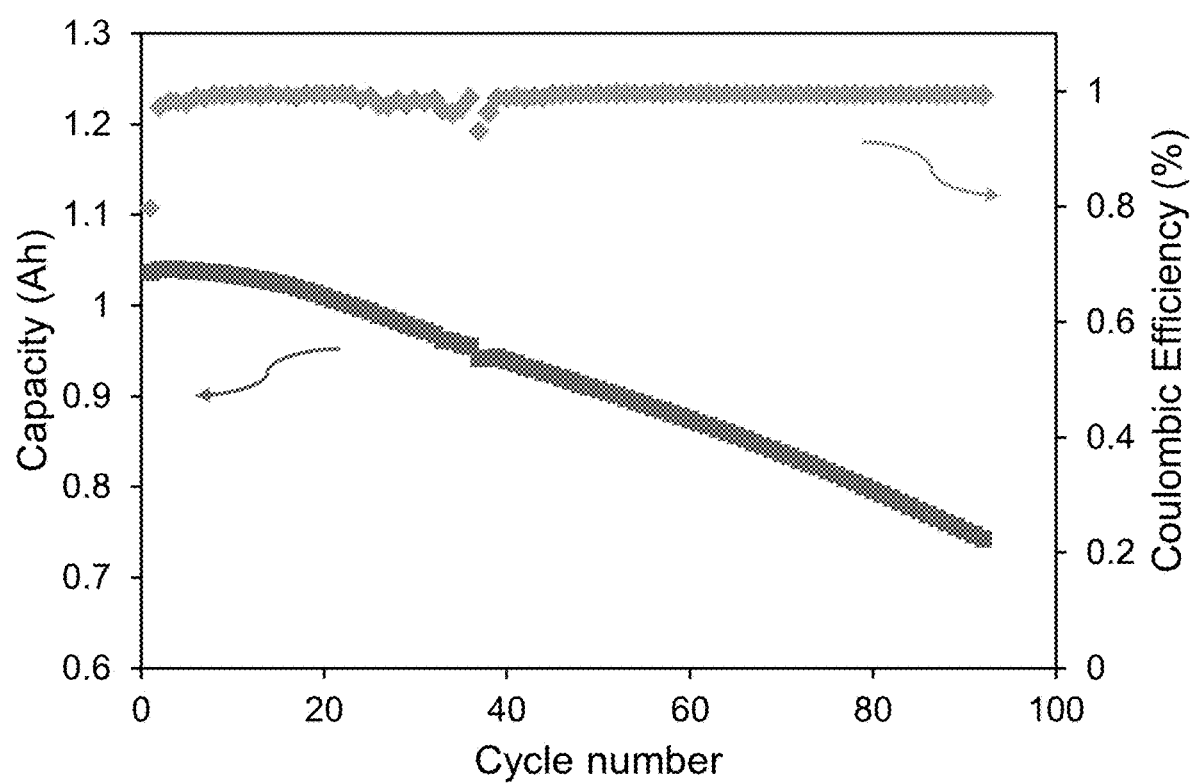
FIG. 1 is a graph of capacity (ampere hour, Ah) and coulombic efficiency (%) at 25° C. versus cycle number when an anode-free pouch cell having the electrolyte of Ex 2 was cycled between 3 to 4.3 volts at C/3 charge and 1 C discharge.
Figure 2:
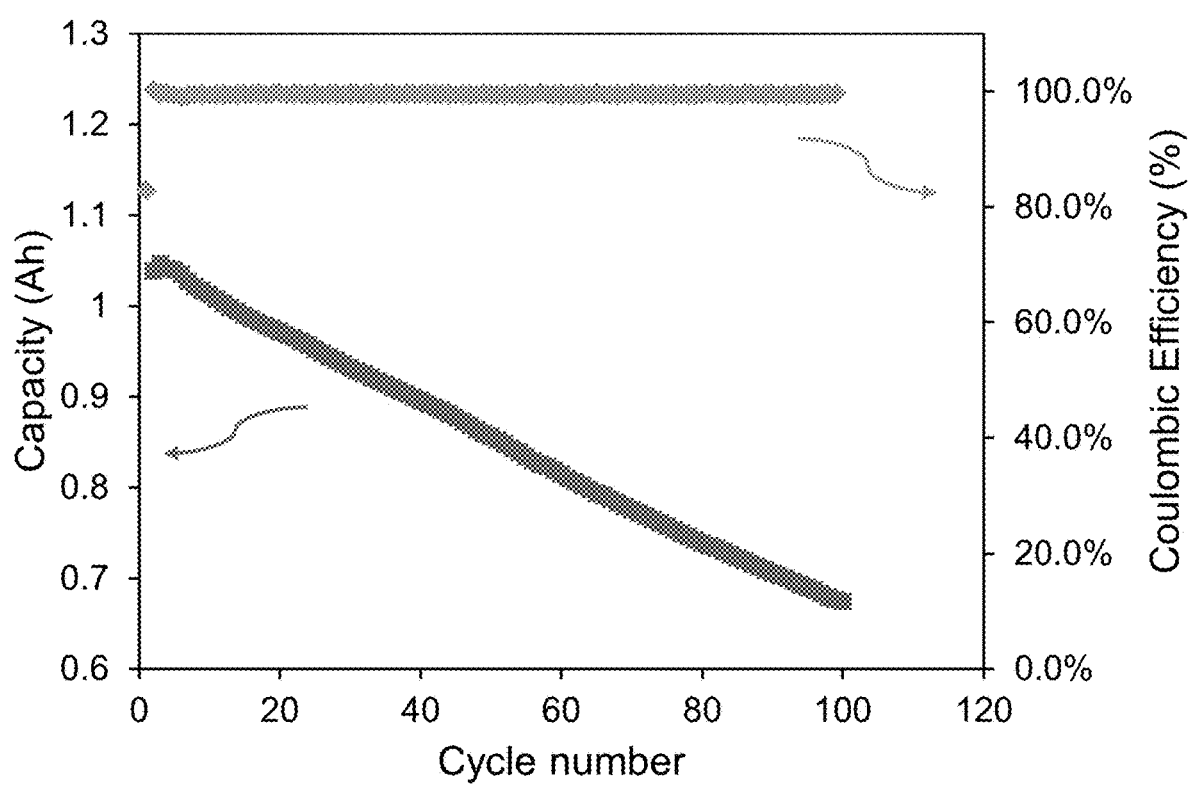
FIG. 2 is a graph of capacity (Ah) and coulombic efficiency (%) at 25° C. versus cycle number when an anode-free pouch cell having the electrolyte of Ex 7 was cycled between 3 to 4.3 volts at C/3 charge and 1 C discharge.
Figure 3:
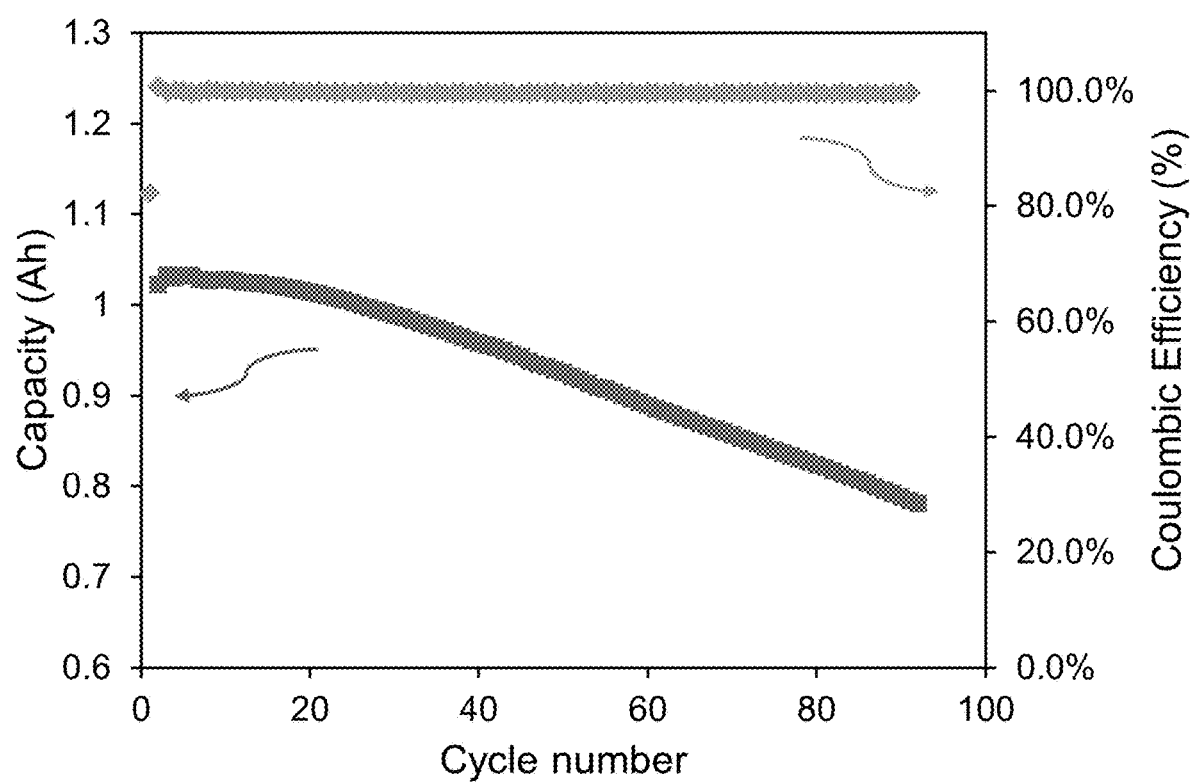
FIG. 3 is a graph of capacity (Ah) and coulombic efficiency (%) at 25° C. versus cycle number when an anode-free pouch cell having the electrolytes of Ex 9 was cycled between 3 to 4.3 volts at C/3 charge and 1 C discharge.
Figure 4:
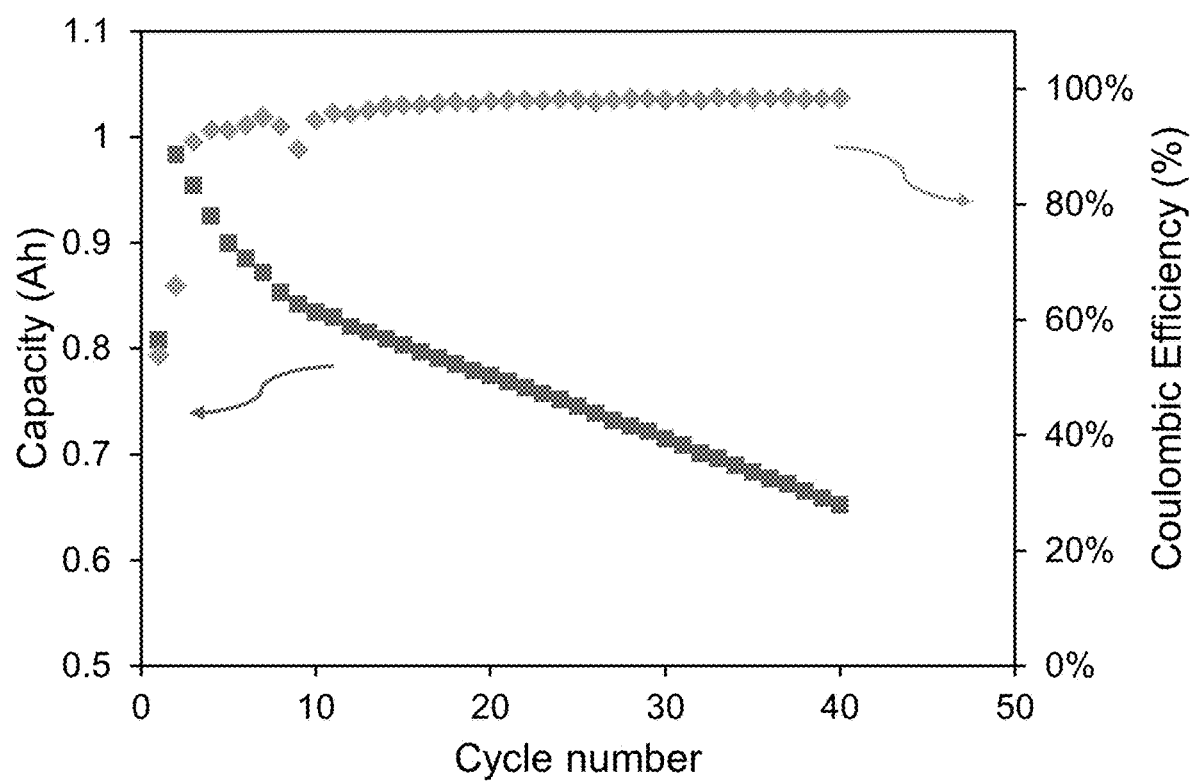
FIG. 4 is a graph of capacity (Ah) and coulombic efficiency (%) at 25° C. versus cycle number when an anode-free pouch cell having the electrolytes of Ex 10 was cycled between 3 to 4.3 volts at C/3 charge and 1 C discharge.
Figure 5:
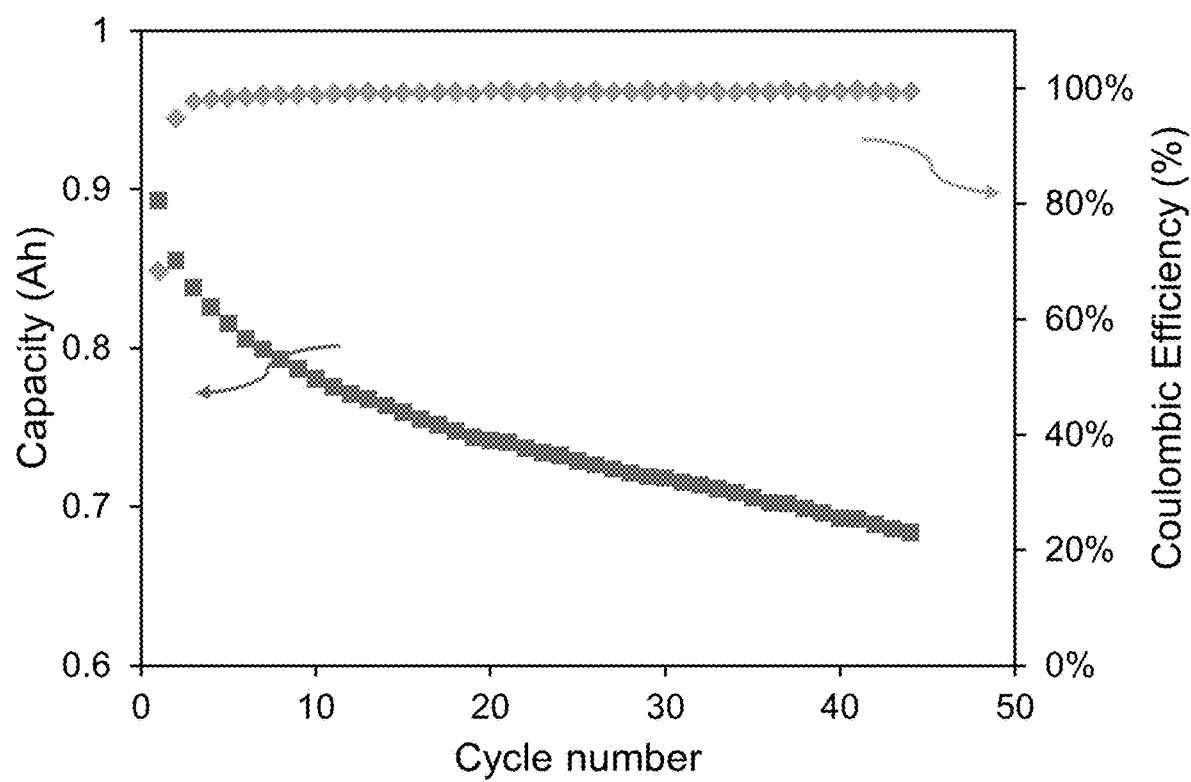
FIG. 5 is a graph of capacity (Ah) and coulombic efficiency (%) at 25° C. versus cycle number when an anode-free pouch cell having the electrolytes of Ex 11 was cycled between 3.6 to 4.3 volts at C/3 charge and 1 C discharge.
Figure 6:
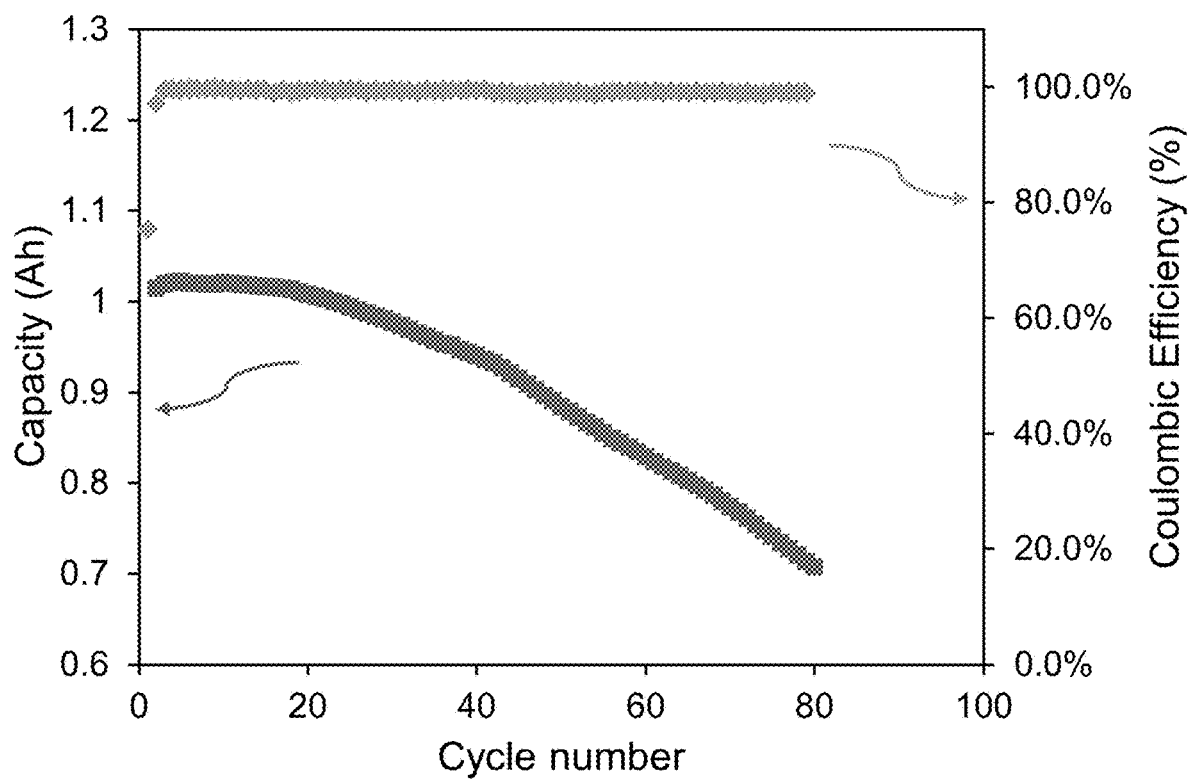
FIG. 6 is a graph of capacity (Ah) and coulombic efficiency (%) at 25° C. versus cycle number when an anode-free pouch cell having the electrolytes of Ex 12 was cycled between 3 to 4.3 volts at C/3 charge and 1 C discharge.
Figure 7:
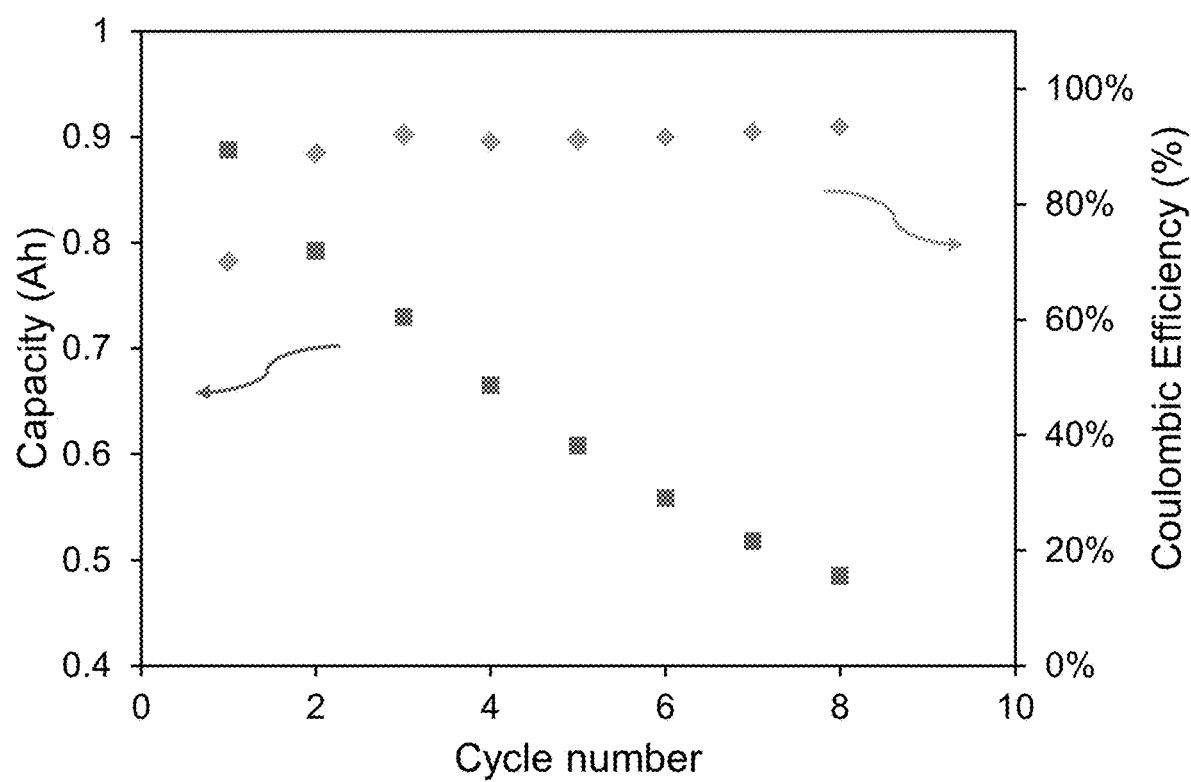
FIG. 7 is a graph of capacity (Ah) and coulombic efficiency (%) at 25° C. versus cycle number when an anode-free pouch cell having the electrolytes of Ex 13 was cycled between 3.6 to 4.3 volts at C/3 charge and 1 C discharge.
Figure 8:
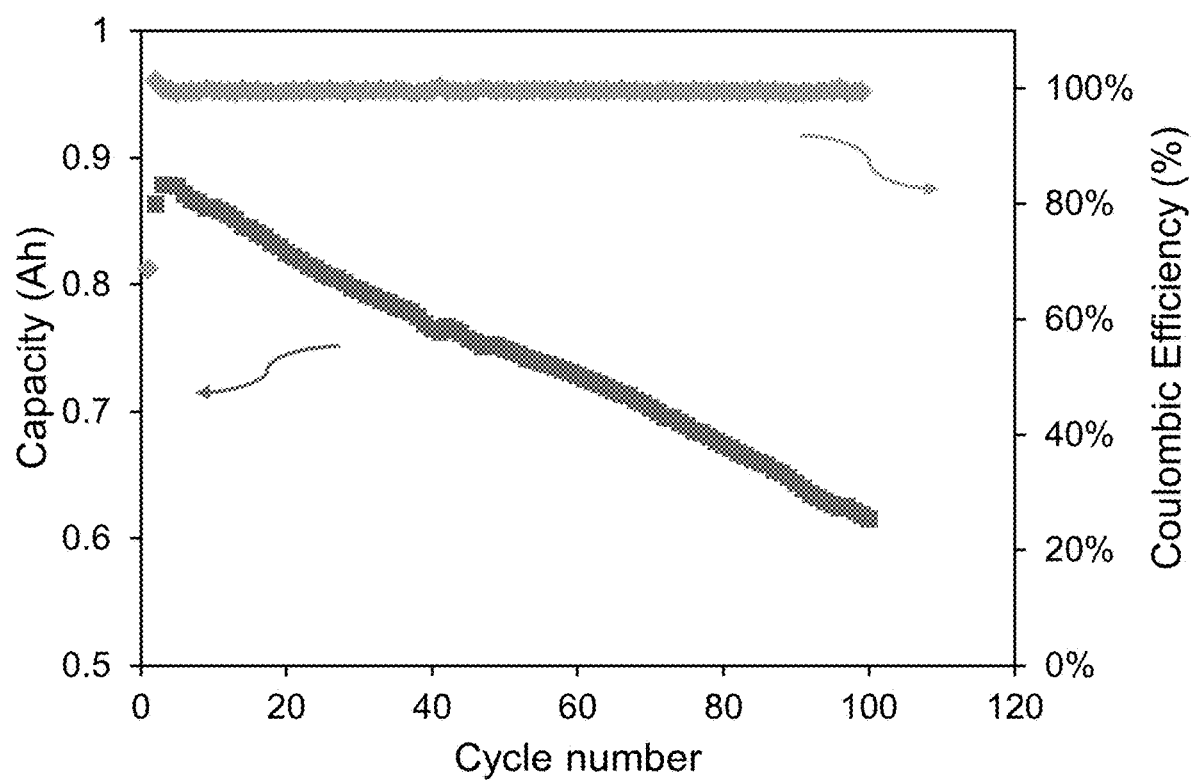
FIG. 8 is a graph of capacity (Ah) and coulombic efficiency (%) at 25° C. versus cycle number when an anode-free pouch cell having the electrolytes of Ex 14 was cycled between 3.6 to 4.3 volts at C/3 charge and 1 C discharge.
Figure 9:
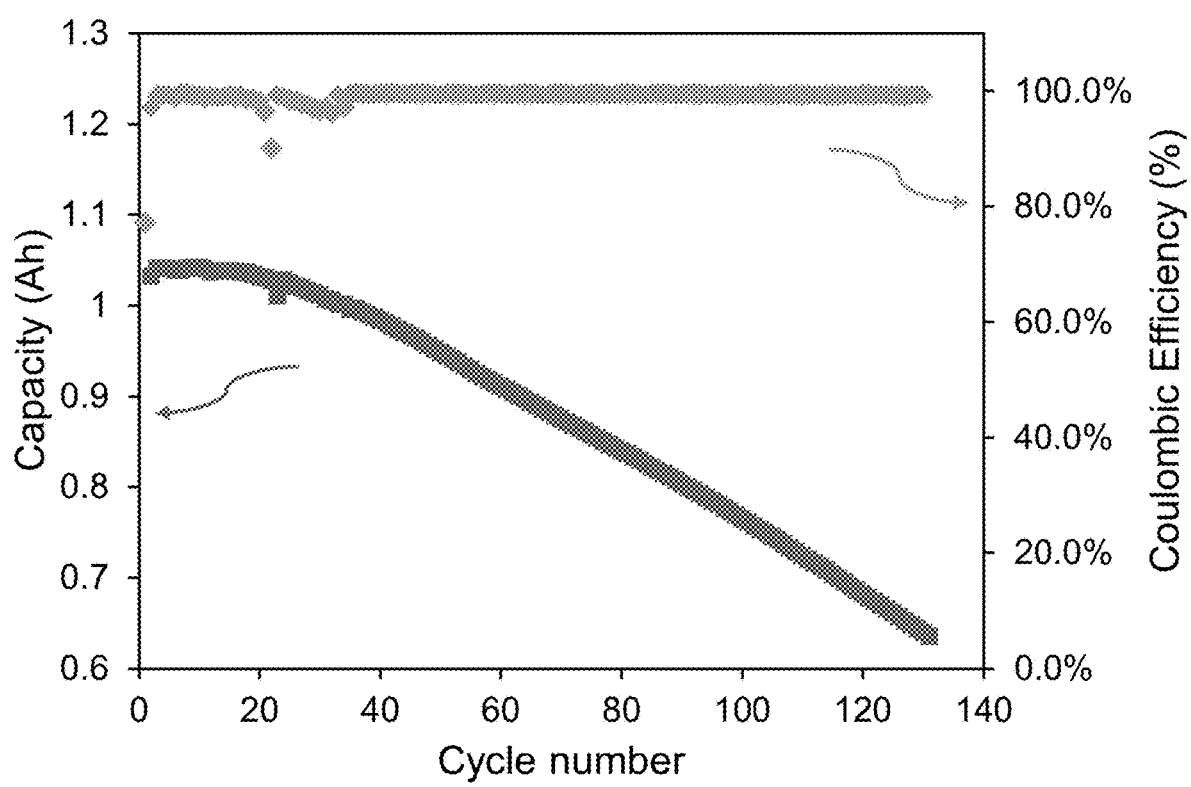
FIG. 9 is a graph of capacity (Ah) and coulombic efficiency (%) at 25° C. versus cycle number when an anode-free pouch cell having the electrolytes of Ex 16 was cycled between 3 to 4.3 volts at C/3 charge and 1 C discharge.
Figure 10:
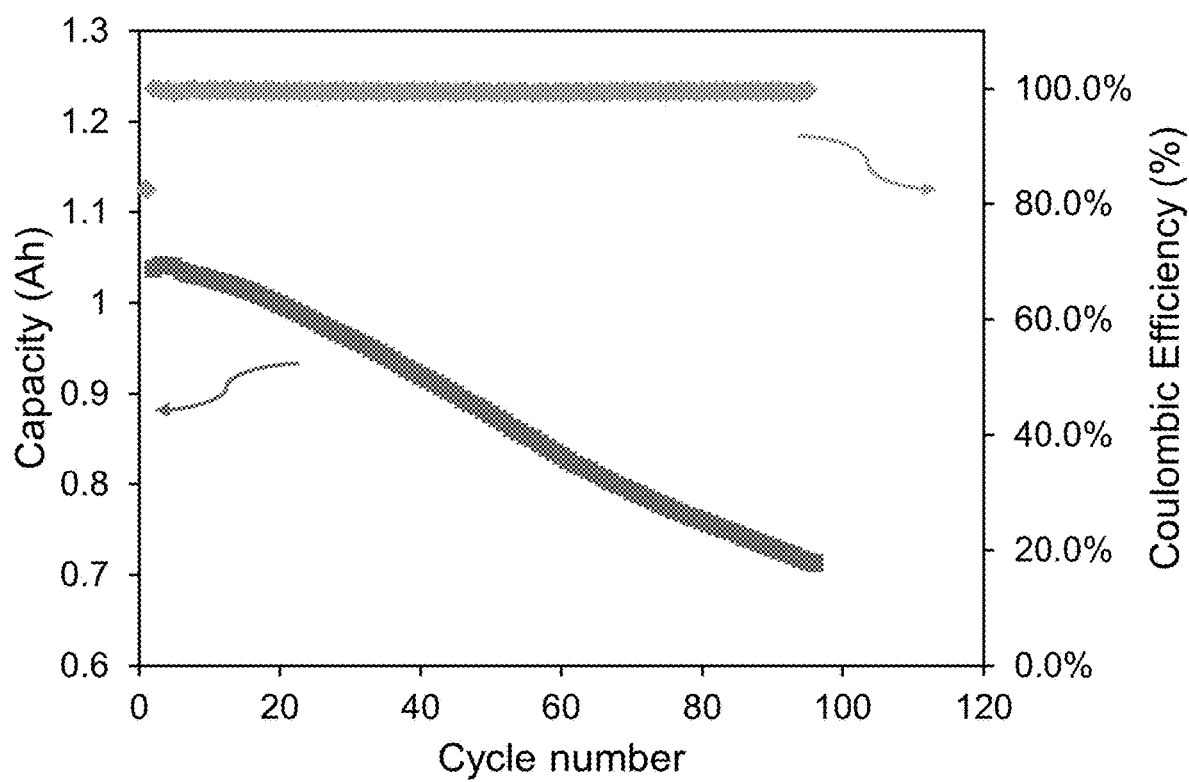
FIG. 10 is a graph of capacity (Ah) and coulombic efficiency (%) at 25° C. versus cycle number when an anode-free pouch cell having the electrolytes of Ex 20 was cycled between 3 to 4.3 volts at C/3 charge and 1 C discharge.
Figure 11:
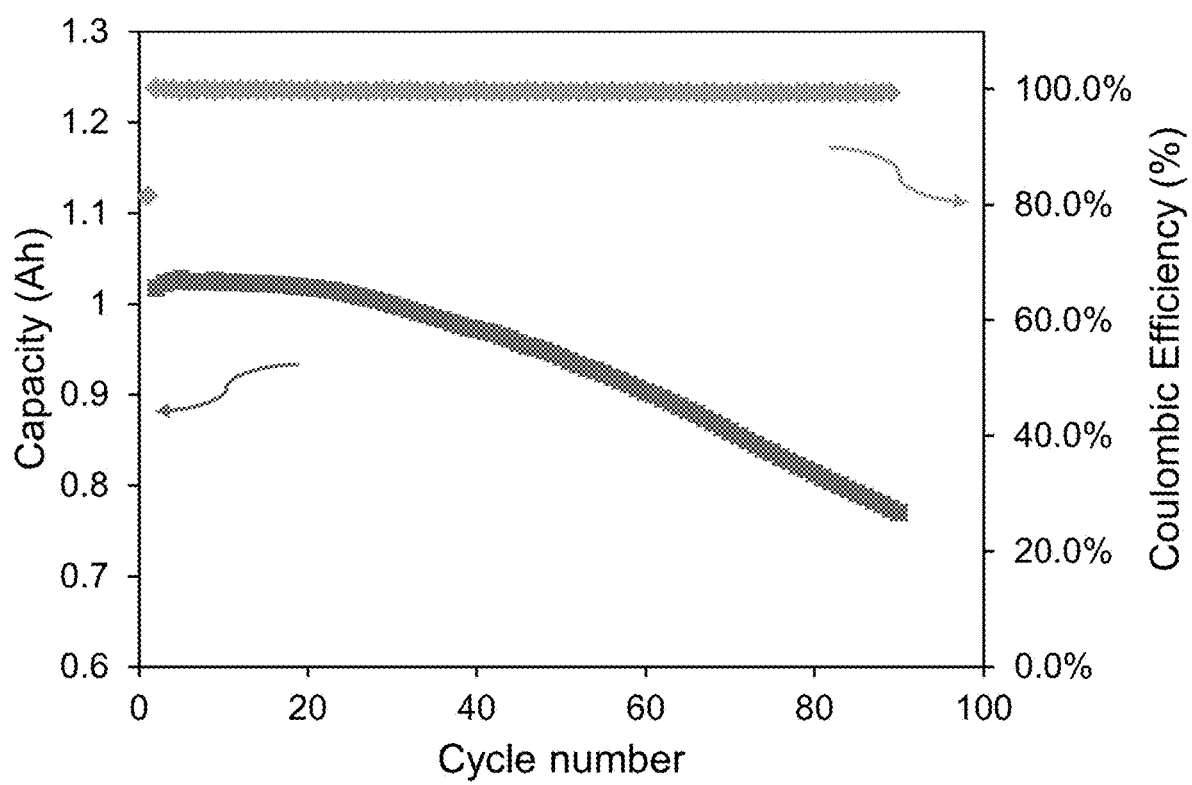
FIG. 11 is a graph of capacity (Ah) and coulombic efficiency (%) at 25° C. versus cycle number when an anode-free pouch cell having the electrolytes of Ex 22 was cycled between 3 to 4.3 volts at C/3 charge and 1 C discharge.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown but are to be accorded the scope consistent with the claims.

Reference to "about" a value or parameter herein includes (and describes) embodiments that are directed to that value or parameter per se. For example, description referring to "about X" includes description of "X". In some embodiments, the term "about" when used in association with a measurement, or used to modify a value, a unit, a constant, or a range of values, refers to variations of 10%, +5%, or +2%.

Reference to "between" two values or parameters herein includes (and describes) embodiments that include those two values or parameters per se. For example, description referring to "between x and y" includes description of "x" and "y" per se.

It is understood that aspects and variations described herein also include "consisting" and/or "consisting essentially of" aspects and variations.

"Combinations" is inclusive of blends, mixtures, alloys, reaction products, and the like. The terms "a" and "an" and "the" do not denote a limitation of quantity and are to be construed to cover both the singular and the plural, unless otherwise indicated herein or clearly contradicted by context. "Or" means "and/or" unless clearly stated otherwise. A "combination thereof" is open and includes any combination comprising at least one of the listed components or properties optionally together with a like or equivalent component or property not listed.

"Alkyl" as used herein refers to and includes, unless otherwise stated, a saturated linear (i.e., unbranched) or branched univalent hydrocarbon chain or combination thereof, having the number of carbon atoms designated (i.e., $C_1$-$C_2$ means one to two carbon atoms). Examples of alkyl groups include, but are not limited to, groups such as methyl, ethyl, and the like.

"Anode-free" as used herein indicates that at manufacture the cell does not contain a anode (negative) active material on the anode current collector, for example when lithium metal is deposited on the anode current collector on charge to provide lithium as the anode active material.

"Fluoroalkyl" refers to an alkyl group in which one or more hydrogen atoms have been substituted for fluorine.

Fluorinated diethers with a limited fluorination degree are disclosed. The fluorinated diethers can be used optionally together with a fluorinated ether with a high fluorination degree as solvents to provide electrolytes with high ionic conductivity and high electrochemical stability.

Fluorinated Diethers with Limited Degree of Fluorination

As used herein, a fluorinated diether with a limited degree of fluorination (also referred to as "fluorinated diether" or "first fluorinated diether" herein) has a degree of fluorination of 10% to 25%, 14% to 25%, or 14% to 20%, wherein the degree of fluorination is determined by dividing a total number of carbon atoms in the fluorinated diether, which is substituted with at least one fluoro, by a total number of carbon atoms in the fluorinated diether.

The fluorinated diether with a limited degree of fluorination can have a structure represented by Formula (I):

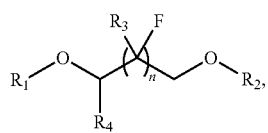

Formula (I)

wherein:
  $R_1$ and $R_2$ are each independently $C_1$-$C_2$alkyl or $C_1$-$C_2$fluoroalkyl;
  $R_3$ is hydrogen or fluoro;
  $R_4$ is hydrogen, fluoro, or $C_1$-$C_2$fluoroalkyl;
  n is 0 or 1;
  provided that when n is 0 and $R_4$ is hydrogen, at least one of $R_1$ and $R_2$ is $C_1$-$C_2$fluoroalkyl.
  Optionally, the fluorinated diether is not

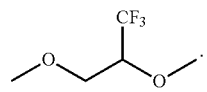

The compounds of Formula (I) also include ethers in which the variables $R_1$-$R_4$ and n carry the definitions (a) to (g), as set forth below. The variable definitions can be combined in any combination that results in a stable compound.
  (a) n is 1.
  (b) $R_3$ is hydrogen or fluoro.
  (c) n is 0.
  (d) At least one of $R_1$ or $R_2$ is $C_1$-$C_2$fluoroalkyl.
  (e) At least one of $R_1$ or $R_2$ is methyl.
  (f) At least one of $R_1$ or $R_2$ is ethyl.
  (g) $R_4$ is fluoro, or $C_1$-$C_2$fluoroalkyl.
  As used herein, at least one of $R_1$ or $R_2$ means one or both of $R_1$ and $R_2$ can be the designated group.

Some examples of the compound of Formula (I) are as follows:

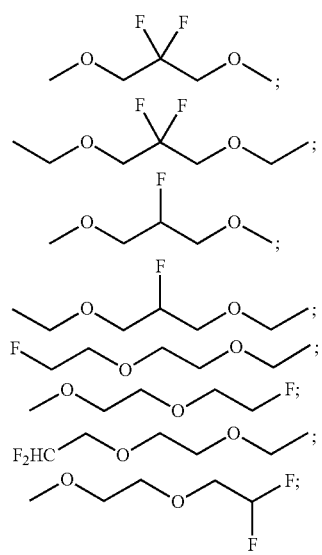

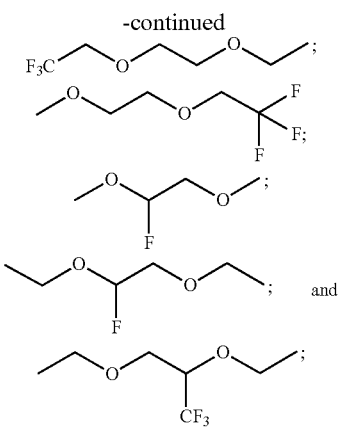

Electrolytes

The fluorinated diether with a limited degree of fluorination can be used in an electrolyte as a solvent. Accordingly, provided is an electrolyte comprising at least one fluorinated diether with a limited degree of fluorination. For example, the electrolyte can comprise a single fluorinated diether with a limited degree of fluorination or the electrolyte can comprise 2, 3, 4, or 5 fluorinated diethers, wherein at least one, at least two, at least three, at least four, or at least five fluorinated diethers are each independently a fluorinated diether with a limited degree of fluorination. The electrolyte can also contain a fluorinated diether with a limited degree of fluorination and a second fluorinated ether with a high degree of fluorination such as 1,1,2,2-tetrafluoroethyl-2,2,3,3-tetrafluoropropyl ether; bis(2,2,2-trifluoroethyl) ether; 1H,1H,5H-octafluoropentyl-1,1,2,2-tetrafluoroethylether; 2,2,2-trifluoroethyl-1,1,2,2-tetrafluoroethyl ether; tris(2,2,2-trifluoroethyl) orthoformate; 1,1,1,2,3,3-hexafluoro-3-(2,2,2-trifluoroethoxy)propane; hexafluoroisopropyl methyl ether; or 1,2-bis(1,1,2,2-tetrafluoroethoxy)ethane.

In an aspect, an electrolyte contains a salt, a fluorinated diether having a limited degree of fluorination (first fluorinated diether), and a second fluorinated ether having a high degree of fluorination (second fluorinated ether). Such an electrolyte can have high ionic conductivity and high electrochemical stability.

The first fluorinated diether is the same as the fluorinated diether with a limited degree of fluorination as described herein.

The second fluorinated ether has a degree of fluorination of 40% to 100%, 60% to 95%, or 65% to 90%, wherein the degree of fluorination is determined by dividing a total number of carbon atoms in the second fluorinated ether which is substituted with at least one fluoro by a total number of carbon atoms in the second fluorinated ether.

The second fluorinated ether can comprise at least one of 1,1,2,2-tetrafluoroethyl-2,2,3,3-tetrafluoropropyl ether; bis(2,2,2-trifluoroethyl) ether; 1H,1H,5H-octafluoropentyl-1,1,2,2-tetrafluoroethylether; 2,2,2-trifluoroethyl-1,1,2,2-tetrafluoroethyl ether; tris(2,2,2-trifluoroethyl) orthoformate; 1,1,1,2,3,3-hexafluoro-3-(2,2,2-trifluoroethoxy)propane; hexafluoroisopropyl methyl ether; or 1,2-bis(1,1,2,2-tetrafluoroethoxy)ethane. Preferably, the second fluorinated ether is 1,1,2,2-tetrafluoroethyl-2,2,3,3-tetrafluoropropyl ether or 1,2-bis(1,1,2,2-tetrafluoroethoxy)ethane.

The first fluorinated diether and the second fluorinated ether can have a volume ratio of 1:4 to 4:1, preferably 7:3 to 3:7.

A sum of a weight of the first fluorinated diether and a weight of the second fluorinated ether can be 60 wt. % to 95 wt %, preferably 75 wt. % to 80 wt. %, based on a total weight of the electrolyte.

The electrolyte including at least one fluorinated diether with a limited degree of fluorination and the electrolyte including the first fluorinated diether and the second fluorinated ether can further comprise an additional compound that is not the first fluorinated diether, or the second fluorinated ether.

The additional compound can comprise at least one of ethylene carbonate; propylene carbonate; dimethyl carbonate; diethyl carbonate; ethyl methyl carbonate; vinyl carbonate; vinyl ethylene carbonate; fluoroethylene carbonate; difluoroethylene carbonate; 3,3,3-trifluoropropylene carbonate; succinic anhydride, butyric anhydride; monofluoroethyl methyl carbonate; difluoroethyl methyl carbonate; trifluoroethyl methyl carbonate; bis(2,2,2-trifluoroethyl) carbonate; 1,2-dimethyoxylethane; 1,2-diethyoxylethane; 1,3-dioxolane; 1,4-dioxane; tetrahydrofuran; tetravinyl silane; acetonitrile; ethyl acetate; methyl acetate; methyl propanoate; ethyl propanoate; propyl propanoate; succinonitrile; adiponitrile; 1,3,6-Hexanetricarbonitrile; trimethyl borate; triphenyl borate; triethyl borate; tris(pentafluorophenyl)borane; tris(trimethylsilyl)phosphate; tris(2,2,2-trifluoroethyl) borate; trimethyl phosphate; triethyl phosphate; tris(trimethylsilyl)phosphate; tris(trimethylsilyl)phosphite; tris(2,2,2-trifluoroethyl) phosphate; tris(2,2,2-trifluoroethyl) phosphite; (pentafluorophenyl)diphenyl phosphine; tris (pentafluorophenyl) phosphine; ethoxy(pentafluoro) cyclotriphosphazene; 1,3,2-dioxathiolane-2,2-dioxide; 1,3-propanesultone; prop-1-ene-1,3-sultone; propanediol cyclic sulfate; ethylene sulfite; 1,4-butane sulfone; dimethyl sulfoxide; methylene methanedisulfonate; 1,2,6-oxadithiane-2,2,6,6-tetraoxide; N,N-Dimethylformamide; gamma-butyrolactone; fluorobenzene; 1,2-difluorobenzene; benzotrifluoride; (trifluoromethoxy)benzene; dichloromethane; 1-fluoro-2-(2-methoxyethoxy)ethane; 1,1-difluoro-2-(2-methoxyethoxy)ethane; 1,1,1-trifluoro-2-(2-methoxyethoxy)ethane; 1-ethoxy-2-(2-fluoroethoxy)ethane; 2-(2-ethoxyethoxy)-1,1-difluoroethane; 1,2-bis(2-fluoroethoxy) ethane; 1,1-difluoro-2-(2-(2-fluoroethoxy)ethoxy)ethane; 1,1,1-trifluoro-2-(2-(2-fluoroethoxy)ethoxy)ethane; 2-(2-ethoxyethoxy)-1,1,1-trifluoroethane; 1,2-bis(2,2-difluoroethoxy)ethane; 2-(2-(2,2-difluoroethoxy)ethoxy)-1,1,1-trifluoroethane; or 1,2-bis(2,2,2-trifluoroethoxy)ethane. A combination comprising at least one of the foregoing may be used.

In some embodiments, the electrolyte does not contain the additional compound, for example the electrolyte can be free of carbonates. In other embodiments, the electrolyte contains an additional compound as described herein, and the proportion of all the fluorinated ethers in the electrolyte can be between about 0.5 wt. % and 99.5 wt. %, based on a total weight of the electrolyte. Specifically, the electrolyte can contain an additional compound as described herein, and the proportion of all the fluorinated ethers in the electrolyte can be about 0.5 wt. %, about 1 wt. % about 5 wt. %, about 10 wt. %, about 15 wt. %, about 20 wt. %, about 25 wt. %, about 30 wt. % about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, about 99 wt. %, or about 99.5 wt. % or a range between any two of the preceding values. In some embodiments, the proportion of all the fluorinated ethers in the electrolyte is at least about 1 wt. %, at least about 2 wt. %, at least about 3 wt. %, at least about 4 wt. %, at least about 5 wt. %, at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. %, at least about 60 wt. %, at least about 65 wt. %, at least about 70 wt. %, at least about 75 wt. %, at least about 80 wt. %, at least about 85 wt. %, at least about 90 wt. %, at least about 95 wt. %, at least about 98 wt. %, at least about 99 wt. %, at least about 99 wt. %, or at least about 99.5 wt. %, of the total weight of the electrolyte. Each of the fluorinated ether in the electrolyte can be present in a proportion that is independently selected from between about 0.5 wt. % and about 99.5 wt. %, provided that the total amount of all fluorinated ether components in the electrolyte does not exceed 99.5 wt. %.

A content of the additional compound, if present, can be about 0.5 wt. % to about 99 wt. %, about 10 wt. % to about 90 wt. %, about 20 wt. % to about 80 wt. %, or about 30 wt. % to about 70 wt. %, based on a total weight of the electrolyte. A content of the additional compound can be about 0.5 vol % to about 99.5 vol wt. %, about 10 vol % to about 90 vol %, about 20 vol % to about 80 vol %, or about 30 vol % to about 70 vol %, based on a total volume of the electrolyte.

The electrolyte can further comprise at least one salt. The salt can comprise at least one of a lithium salt, a potassium salt, or a sodium salt. For example, the electrolyte can comprise at least one of lithium bis(fluorosulfonyl)imide (LiFSI); lithium bis(trifluoromethanesulfonyl)imide (LiTFSI); lithium bis(pentafluoroethanesulfonyl)imide (LiBETI), lithium hexafluorophosphate (LiPF$_6$); lithium hexafluoroarsenate (LiAsF$_6$); lithium tetrafluoroborate (LiBF$_4$); lithium bis(oxalato)borate (LiBOB); lithium difluoro(oxalato)borate (LiDFOB); lithium difluorophosphate (LiDFP); lithium difluoro(dioxalato)phosphate (LiDFDOP); lithium tetrafluoro(oxalato)phosphate (LiTFOP); lithium nitrate (LiNO$_3$); lithium perchlorate (LiClO$_4$); lithium triflate (LiTf); lithium trifluoroacetate (LiTFA); lithium 4,5-dicyano-2-(trifluoromethyl)imidazole (LiTDI); sodium hexafluorophosphate (NaPF$_6$); sodium bis(fluorosulfonyl)imide (NaFSI); sodium bis(trifluoromethanesulfonyl)imide (NaTFSI); sodium triflate (NaTf); sodium bis(pentafluoroethanesulfonyl)imide (NaBETI); potassium hexafluorophosphate (KPF$_6$); potassium bis(fluorosulfonyl)imide (KFSI); potassium bis(trifluoromethanesulfonyl)imide (KTFSI); potassium triflate (KTf); cesium bis(fluorosulfonyl)imide (CsFSI); cesium bis(trifluoromethanesulfonyl)imide (CsTFSI); magnesium bis(trifluoromethanesulfonyl)imide (Mg(TFSI)$_2$); zinc bis(trifluoromethanesulfonyl)imide (Zn(TFSI)$_2$); calcium bis(trifluoromethanesulfonyl)imide (Ca(TFSI)$_2$); silver bis(trifluoromethanesulfonyl)imide (AgTFSI); aluminum bis(trifluoromethanesulfonyl)imide (Al(TFSI)$_3$); or lanthanum bis(trifluoromethanesulfonyl)imide (La(TFSI)$_3$). A combination comprising at least one of the foregoing may be used.

In some embodiments, the electrolyte comprises the fluorinated diether of Formula (I) with a limited degree of fluorination or a combination of the first fluorinated diether and the second fluorinated ether of any of the foregoing embodiments, and a salt of any of the foregoing embodiments (e.g., a lithium salt). As an example, the electrolyte comprises at least one fluorinated diether with a limited degree of fluorination, or a combination of the first fluorinated diether and the second fluorinated ether, and the additional compound of the foregoing embodiments, and a salt of any of the foregoing embodiments (e.g., lithium salt). An amount of all the fluorinated ethers or a sum of the amounts of all the fluorinated ethers and the additional compound in the electrolyte can be at least about 60% by weight of a total weight of the electrolyte, such as at least about 65% by weight, at least about 70% by weight, at least about 75% by weight, at least about 80% by weight, at least about 85% by weight; or at least about 90% by weight, based on the total weight of the electrolyte. The electrolyte can consist essentially of, or consists of (i) at least one of the fluorinated diether having a limited degree of fluorination, or a combination of the first fluorinated diether and the second fluorinated ether; (ii) optionally at least one of the additional compound; and (iii) the salt (e.g., lithium salt). In some embodiments, the electrolyte comprises, consists essentially of, or consists of (i) at least one of the fluorinated diether of Formula (I), or a combination of the first fluorinated diether and the second fluorinated ether; (ii) at least one of the additional compound such as ethers or carbonates; and (iii) the salt (e.g., lithium salt). Examples of the salt include those elaborated above.

As another example, an electrolyte (also referred to as "a preferred electrolyte example") comprises, consisting essentially of, or consists of a first fluorinated diether, a second fluorinated ether, a salt, and optionally 0.1 to 30 wt % of an additional compound based on a total weight of the electrolyte, wherein the first fluorinated diether is at least one of:

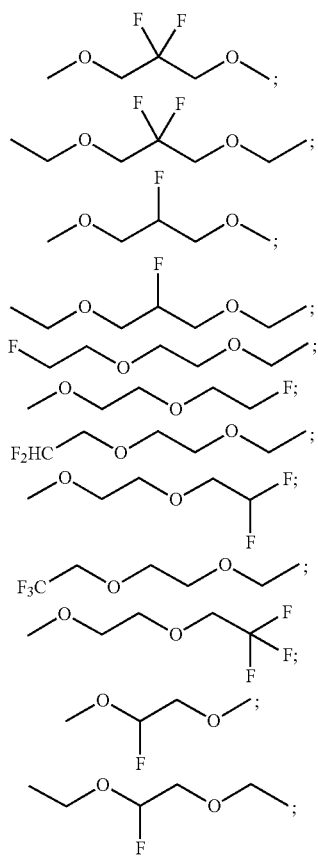

the second fluorinated ether is 1,1,2,2-tetrafluoroethyl-2,2,3,3-tetrafluoropropyl ether or 1,2-bis(1,1,2,2-tetrafluoroethoxy)ethane, the first fluorinated diether and the second fluorinated ether have a volume ratio of 7:3 to 3:7, a sum of a weight of the first fluorinated diether and a weight of the second fluorinated ether is 60 wt. % to 95 wt. % based on a total weight of the electrolyte, the salt comprises a lithium salt, and the additional compound, if present, can be at least one of ethylene carbonate; propylene carbonate; dimethyl carbonate; diethyl carbonate; ethyl methyl carbonate; vinyl carbonate; vinyl ethylene carbonate; fluoroethylene carbonate; difluoroethylene carbonate; 3,3,3-trifluoropropylene carbonate; succinic anhydride, butyric anhydride; monofluoroethyl methyl carbonate; difluoroethyl methyl carbonate; trifluoroethyl methyl carbonate; bis(2,2,2-trifluoroethyl) carbonate; 1,2-dimethyoxylethane; 1,2-diethyoxylethane; 1,3-dioxolane; 1,4-dioxane; tetrahydrofuran; tetravinyl silane; acetonitrile; ethyl acetate; methyl acetate; methyl propanoate; ethyl propanoate; propyl propanoate; succinonitrile; adiponitrile; 1,3,6-Hexanetricarbonitrile; trimethyl borate; triphenyl borate; triethyl borate; tris(pentafluorophenyl)borane; tris(trimethylsilyl)phosphate; tris(2,2,2-trifluoroethyl) borate; trimethyl phosphate; triethyl phosphate; tris(trimethylsilyl)phosphate; tris(trimethylsilyl)phosphite; tris(2,2,2-trifluoroethyl) phosphate; tris(2,2,2-trifluoroethyl) phosphite; (pentafluorophenyl)diphenyl phosphine; tris(pentafluorophenyl) phosphine; ethoxy(pentafluoro)cyclotriphosphazene; 1,3,2-dioxathiolane-2,2-dioxide; 1,3-propanesultone; prop-1-ene-1,3-sultone; propanediol cyclic sulfate; ethylene sulfite; 1,4-butane sulfone; dimethyl sulfoxide; methylene methanedisulfonate; 1,2,6-oxadithiane-2,2,6,6-tetraoxide; N,N-Dimethylformamide; gamma-butyrolactone; fluorobenzene; 1,2-difluorobenzene; benzotrifluoride; (trifluoromethoxy)benzene; dichloromethane; 1-fluoro-2-(2-methoxyethoxy)ethane; 1,1-difluoro-2-(2-methoxyethoxy)ethane; 1,1,1-trifluoro-2-(2-methoxyethoxy)ethane; 1-ethoxy-2-(2-fluoroethoxy)ethane; 2-(2-ethoxyethoxy)-1,1-difluoroethane; 1,2-bis(2-fluoroethoxy)ethane; 1,1-difluoro-2-(2-(2-fluoroethoxy)ethoxy)ethane; 1,1,1-trifluoro-2-(2-(2-fluoroethoxy)ethoxy)ethane; 2-(2-ethoxyethoxy)-1,1,1-trifluoroethane; 1,2-bis(2,2-difluoroethoxy)ethane; 2-(2-(2,2-difluoroethoxy)ethoxy)-1,1,1-trifluoroethane; 1,2-bis(2,2,2-trifluoroethoxy)ethane; lithium bis(fluorosulfonyl)imide (LiFSI), lithium bis(trifluoromethanesulfonyl)imide (LiTFSI), lithium bis(pentafluoroethanesulfonyl)imide (LiBETI), lithium hexafluorophosphate (LiPF$_6$), lithium hexafluoroarsenate (LiAsF$_6$), lithium tetrafluoroborate (LiBF$_4$), lithium bis(oxalato)borate (LiBOB), lithium difluoro(oxalato)borate (LiDFOB), lithium difluorophosphate (LiDFP), lithium difluoro(dioxalato)phosphate (LiDFDOP), lithium tetrafluoro(oxalato)phosphate (LiTFOP), lithium nitrate (LiNO$_3$), lithium perchlorate (LiClO$_4$), lithium triflate (LiTf), lithium trifluoroacetate (LiTFA), lithium 4,5-dicyano-2-(trifluoromethyl)imidazole (LiTDI), sodium hexafluorophosphate (NaPF$_6$), sodium bis(fluorosulfonyl)imide (NaFSI), sodium bis(trifluoromethanesulfonyl)imide (NaTFSI), sodium triflate (NaTf), potassium hexafluorophosphate (KPF$_6$), potassium bis(fluorosulfonyl)imide (KFSI), potassium bis(trifluoromethanesulfonyl)imide (KTFSI), potassium triflate (KTf), cesium bis(fluorosulfonyl)imide (CsFSI), cesium bis(trifluoromethanesulfonyl)imide (CsTFSI), magnesium bis(trifluoromethanesulfonyl)imide (Mg(TFSI)$_2$), zinc bis(trifluoromethanesulfonyl)imide (Zn(TFSI)$_2$), calcium bis(trifluoromethanesulfonyl)imide (Ca(TFSI)$_2$), silver bis(trifluoromethanesulfonyl)imide (AgTFSI), aluminum bis(trifluoromethanesulfonyl)imide (Al(TFSI)$_3$), or lanthanum bis(trifluoromethanesulfonyl)imide (La(TFSI)$_3$). A combination comprising at least one of the foregoing may be used.

Preferably, the electrolyte does not undergo oxidation below a potential of 6V vs. Li$^+$/Li. Each of the one or more fluorinated diether having a limited degree of fluorination can have a first oxidation potential that is greater than 6V vs. Li$^+$/Li. The electrolyte may not undergo reduction above a potential of 0V vs. Li$^+$/Li. Each of the fluorinated diether having a limited degree of fluorination can have a first reduction potential that is more negative than 0V vs. Li$^+$/Li. The electrolyte can also have an electrochemical stability window of at least 0V to 6V vs. Li$^+$/Li. The fluorinated diether having a limited degree of fluorination can have a collective electrochemical stability window of at least 0V to 6V vs. Li$^+$/Li. Each of the fluorinated diether having a limited degree of fluorination and the second fluorinated diether can have an electrochemical stability window of at least 0V to 6V vs. Li$^+$/Li.

The electrolyte can be prepared by combining a fluorinated diether having a limited degree of fluorination with at least one salt. The electrolyte can also be prepared by combining a first fluorinated diether, a second fluorinated ether, and at least one salt.

Electrochemical Cell

The electrolyte as described herein can be used in electrochemical cell. Such an electrochemical cell comprises an anode, a cathode, and an electrolyte as described herein. The electrochemical cell can also comprise a separator between the cathode and the anode. The electrochemical cell can be a battery. A method of preparing the electrochemical cell comprises providing an electrolyte as described herein; and adding the electrolyte to an assembly comprising a cathode and an anode, to manufacture the electrochemical cell.

The anode can comprise a current collector (also referred to as an "anode current collector"). Examples of metals that can be used for the current collector include, but are not limited to, copper, aluminum, lithium, sodium, potassium, magnesium, stainless steel, or an alloy containing such metals(s), among others. In some embodiments, the anode comprises (optionally solely) the anode current collector, and the electrochemical cell is an anode-free lithium, sodium, or potassium battery. Optionally, the anode does not comprise an anode active material on the anode current collector.

Alternatively, the anode of the electrochemical cell comprises an element which is at least one of lithium, sodium, or potassium. For example, the anode comprises lithium metal.

The anode can comprise at least one of lithium metal, graphite, graphene, expanded graphite, hard carbon, silicon, silicon deposited on carbon, silicon monoxide, a graphite-silicon composite, a graphite-silicon monoxide composite, a graphite-silicon nitride composite, a graphite-silicon carbide composite, lithium titanate, titanium dioxide, sodium titanate, a transition metal oxide, tin, antimony, molybdenum disulfide, a nickel-containing sulfide, sodium titanium phosphate, a MXene, sodium metal, or potassium metal. A combination comprising at least one of the foregoing may be used.

The cathode can comprise at least one of sulfur, a lithium nickel manganese cobalt oxide (NMC), a layered lithium nickel manganese oxide (NM), a lithium nickel cobalt aluminum oxide (NCA), a lithium nickel manganese aluminum oxide (NMA), a lithium nickel manganese cobalt aluminum oxide (NMCA), a lithium nickel oxide (LNO), a spinel lithium nickel manganese oxide (LiNi$_{0.5}$Mn$_{1.5}$O$_4$), a lithium cobalt oxide (LCO), a lithium manganese oxide (LMO), a lithium and manganese rich cathode (LMR or LLMO), a lithium iron phosphate (LFP), a lithium cobalt phosphate (LCP), a lithium manganese phosphate (LMP), a lithium manganese iron phosphate (LMFP), a transition metal sulfide, a transition metal fluoride, a sodium cobalt oxide, a sodium chromium oxide, a sodium manganese oxide, a sodium nickel manganese oxide, a sodium vanadium oxide, a sodium iron phosphate (NaFePO$_4$), a sodium vanadium phosphate (Na$_3$V$_2$(PO$_4$)$_3$), a sodium vanadium fluorophosphate (NaVPO$_4$F), a sodium copper nickel iron manganese oxide (Na[Cu$_{1/9}$Ni$_{2/9}$Fe$_{1/3}$Mn$_{1/3}$]O$_2$), a Prussian blue (NaFe[Fe(CN)$_6$]), or a Prussian white (R—Na$_{1.92}$Fe[Fe(CN)$_6$]). The cathode can further comprise at least one of Li, Ni, Co, Al, Fe, Zn, Cu, Mn, Mg, Ca, Ti, Zr, or V. A combination comprising at least one of the foregoing cathode materials, e.g., at least one oxide or phosphate, may be used.

Without wishing to be bound by theory, it is believed that the fluorinated diether having a limited degree of fluorination or a combination of the first fluorinated diether and the second fluorinated ether may suppress or mitigate the formation of undesirable morphologies at the anode or cathode. For example, the fluorinated diether having a limited degree of fluorination or a combination of the first fluorinated diether and the second fluorinated ether may suppress the formation of dendrites or the pulverization at the anode. When the anode comprises lithium metal, the fluorinated diether having a limited degree of fluorination or a combination of the first fluorinated diether and the second fluorinated ether may suppress the formation of lithium dendrites at the anode.

An electrochemical cell (i.e., a battery) can include (1) an anode including an anode current collector, (2) a cathode including a cathode current collector and a cathode active material disposed on the cathode current collector, and (3) an electrolyte as described herein disposed between the anode and the cathode. The anode can further include an anode active material disposed on the anode current collector. The anode active material can comprise at least one of lithium metal, graphite, graphene, expanded graphite, hard carbon, silicon, silicon deposited on carbon, silicon monoxide, a graphite/silicon composite such as a composite of graphite and Si, SiO$_x$, SiC, or Si$_3$N$_4$, sodium metal, hard carbon, lithium titanate (LTO), titanium dioxide (TiO$_2$), sodium titanate (i.e. Na—Ti—O composites), a transition metal oxidea, tin, antimony, molybdenum disulfide (MoS$_2$), a nickel-based sulfide, a sodium titanium phosphate (NaTi$_2$(PO$_4$)$_3$), a MXene, sodium metal, or potassium metal, where silicon monoxide is specifically mentioned. The graphite/silicon composite can include graphite:silicon at a weight ratio of about 5:95, 10:90, 20:80, 30:70, 40:60, 50:50, 60:40, 70:30, 20:80, 90:10, or 95:5. The cathode active material can comprise at least one of a sulfur-based cathode or an air cathode (e.g., a Li—S, Li-SPAN, or a Li-air battery), a lithium nickel manganese cobalt oxide (NMC, e.g., NMC111, NMC532, NMC622, NMC811, NMC900505, NMC95025025, etc.), a layered lithium nickel manganese oxide (NM), a lithium nickel cobalt aluminum oxide (NCA), a lithium nickel manganese aluminum oxide (NMA), a lithium nickel manganese cobalt aluminum oxide (NMCA), a lithium nickel oxide (LNO), a spinel lithium nickel manganese oxide (LiNi$_{0.5}$Mn$_{1.5}$O$_4$), a lithium cobalt oxide (LCO), a lithium manganese oxide (LMO), a lithium and manganese rich cathode (LMR or LLMO), a lithium iron phosphate (LFP), a lithium cobalt phosphate (LCP), a lithium manganese phosphate (LMP), a lithium manganese iron phosphate (LMFP), a transition metal sulfide (e.g., FeS, FeS$_2$, CuS, MoS$_2$, MoS$_3$, TiS$_2$, TiS$_4$, etc.), a sodium vanadium oxide, a sodium iron phosphate (NaFePO$_4$), a sodium vanadium phosphate (Na$_3$V$_2$(PO$_4$)$_3$), a sodium copper nickel iron manganese oxide (Na[Cu$_{1/9}$Ni$_{2/9}$Fe$_{1/3}$Mn$_{1/3}$]O$_2$), a Prussian blue (NaFe[Fe(CN)$_6$]), or Prussian white (R—Na$_{1.92}$Fe[Fe(CN)$_6$]). The cathode active material can further comprise at least one of Li, Ni, Co, Al, Fe, Zn, Cu, Mn, Mg, Ca, Ti, Zr, or V. A combination comprising at least one of the foregoing may be used.

An electrochemical cell (i.e., a battery) can comprise (1) an anode including an anode current collector but without any anode active material on the anode current collector, (2) a cathode including a cathode current collector and a cathode active material as described herein disposed on the cathode current collector, and (3) an electrolyte as described herein disposed between the anode and the cathode.

An electrochemical cell (i.e., a battery) can comprise (1) an anode comprises at least one of lithium metal, graphite, silicon, silicon deposited on carbon, silicon monoxide, a graphite-silicon composite, a graphite-silicon monoxide composite, a graphite-silicon nitride composite, a graphite-silicon carbide composite, (2) a cathode including a cathode current collector and a cathode active material as described herein disposed on the cathode current collector, and (3) an electrolyte as described herein (including the preferred electrolyte example as described herein) disposed between the anode and the cathode.

The presently disclosed subject matter will be better understood by reference to the following Examples, which are provided as exemplary of the invention, and not by way of limitation.

EXAMPLES

All the electrolytes shown in the table below contained 2 M LiFSI. The electrolytes of Ex 4, Ex 10, Ex 13, and Ex 17 contained one fluorinated diether solvent. The electrolytes Ex 5, Ex 6, Ex 7, Ex 8, Ex 9, Ex 11, Ex 12, Ex 14, Ex 15, Ex 16, Ex 18, Ex 19, Ex 20, Ex 21, Ex 22, Ex 23, Ex 24 and Ex 25 further included a second fluorinated ether, namely, 1,1,2,2-tetrafluoroethyl-2,2,3,3-tetrafluoropropylether (TTE), as a co-solvent. Ex 26 indicated that 2 M LiFSI is insoluble in 1,2-bis(1,1,2,2-tetrafluoroethoxy)ethane, which is a fluorinated diether with higher fluorination degree (66.7%). The control electrolytes were formulated with 2 M LiFSI in nonfluorinated diethoxy ether (DEE) (Ex 1), DEE with TTE (Ex 2), and DEE with 1,2-bis(1,1,2,2-tetrafluoroethoxy)ethane (Ex 3). The structures of DEE and the fluorinated diethers used in the examples are shown below:

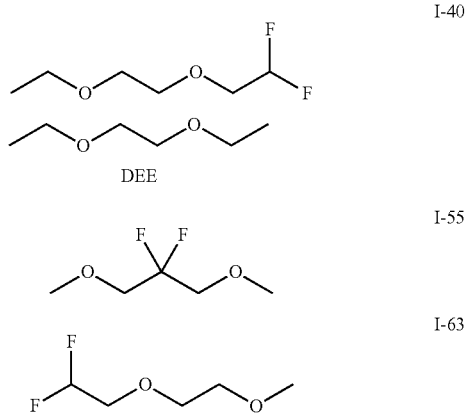

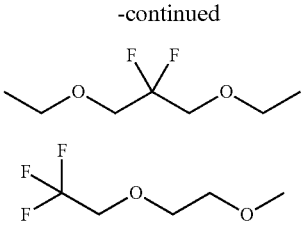

I-56

I-64

Figure 12:
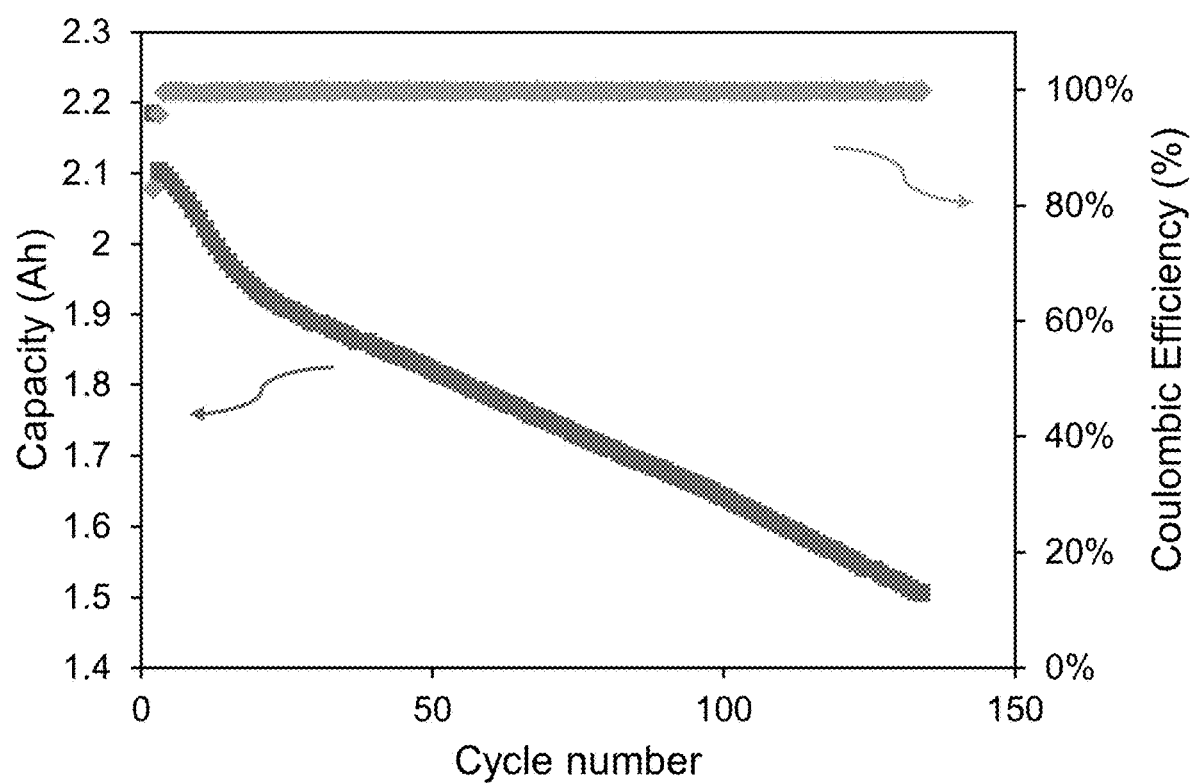
FIG. 12 is a graph of capacity (Ah) and coulombic efficiency (%) at 25° C. versus cycle number when a silicon monoxide anode pouch cell having the electrolyte of Ex 23 was cycled between 2.5 to 4.25 volts at C/2 charge and 1 C discharge.
Figure 13:
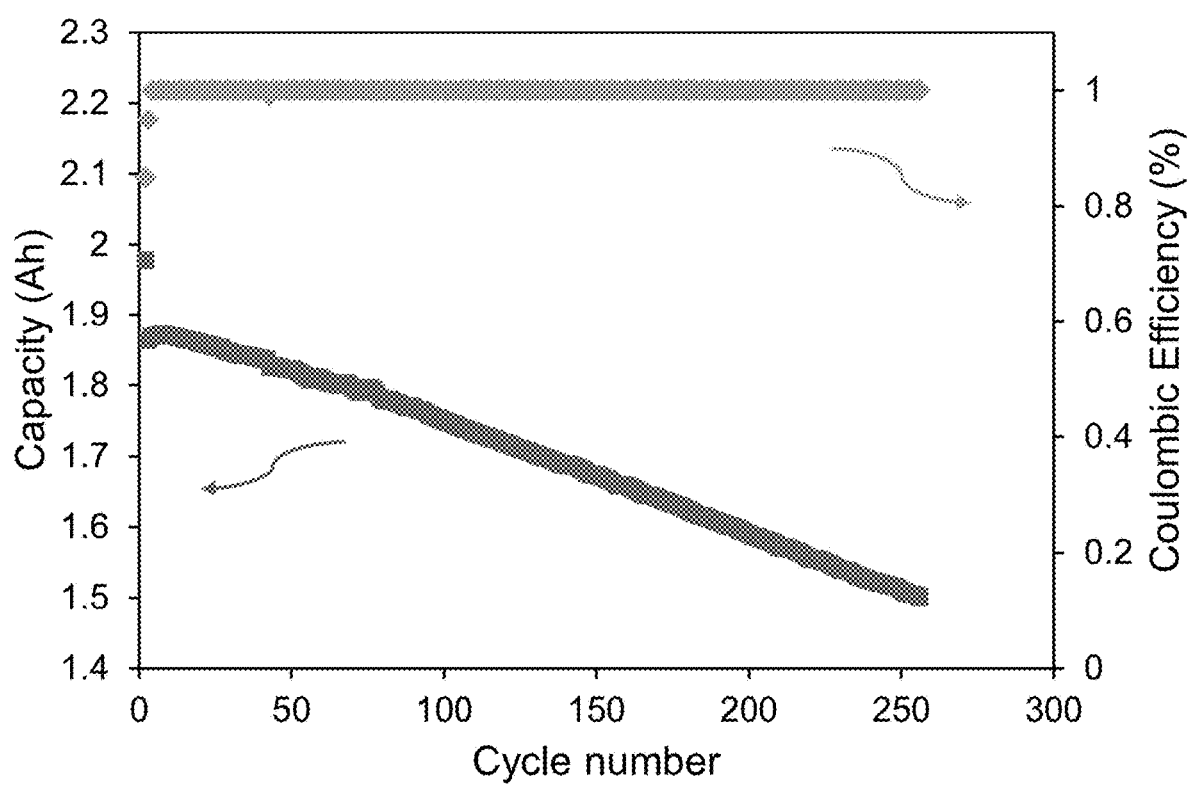
FIG. 13 is a graph of capacity (Ah) and coulombic efficiency (%) at 25° C. versus cycle number when a silicon monoxide anode pouch cell having the electrolyte of Ex 24 was cycled between 2.5 to 4.25 volts at C/2 charge and 1 C discharge.
Figure 14:
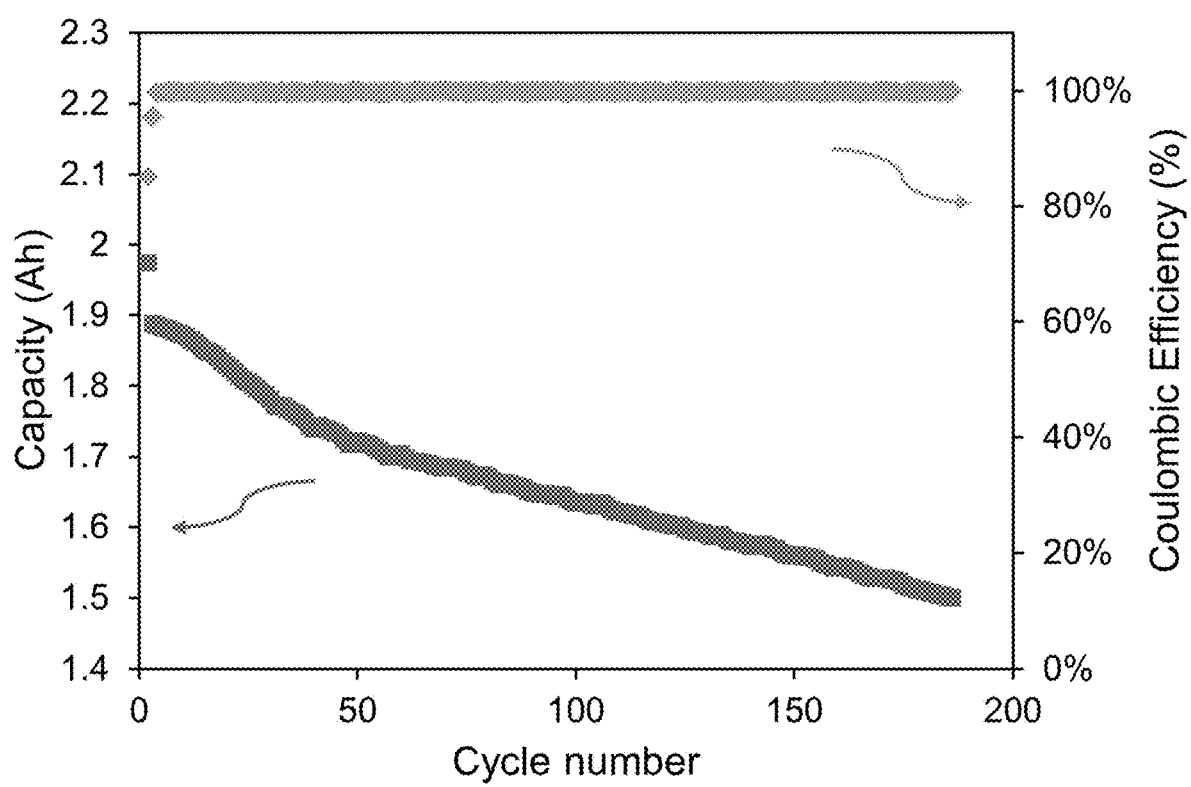
FIG. 14 is a graph of capacity (Ah) and coulombic efficiency (%) at 25° C. versus cycle number when a silicon monoxide anode pouch cell having the electrolyte of Ex 25 was cycled between 2.5 to 4.25 volts at C/2 charge and 1 C discharge.

Cycle life was tested using anode-free or silicon monoxide anode pouch cells with nickel-manganese-cobalt (NMC) cathodes, carbon or silicon monoxide-coated copper current collector and ceramic-coated polyethylene (PE) separator. The anode-free pouch cells (Ex 1 to Ex 22) were cycled between 3 to 4.3 V at C/3 charging and 1 C discharge. The silicon monoxide anode pouch cells (Ex 23 to Ex 25) were cycled between 2.5 to 4.25 V at C/2 charging and 1 C discharge. The results are summarized in the table below. The capacity retention and Coulombic efficiencies of the anode-free pouch cells containing the electrolytes of Ex 2, Ex 7, Ex 9, Ex 10, Ex 11, Ex 12, Ex 13, Ex 14, Ex 16, Ex 20 and Ex 22 are also shown in FIGS. 1-11. The capacity decay and Coulombic efficiencies of the silicon monoxide anode pouch cells containing the electrolytes of Ex 23, Ex 24, and Ex 25 are also shown in FIGS. 12-14.

milder degree. In addition, using a fluorinated diether with a limited degree of fluorination with TTE can lead to much better cycle life as compared to using TTE together with DEE (comparing Ex 2 with Ex 7, 11, 14, and 20).

The data also shows that when a co-solvent with a degree of fluorination less than 70% is added to a nonfluorinated diether, the conductivity and cycle life are worse than adding TTE, which has a degree of fluorination of 80%, to a nonfluorinated ether. (Ex 3 versus Ex 2)

While embodiments have been set forth for the purpose of illustration, the foregoing descriptions should not be deemed a limitation on the scope herein. Accordingly, various modifications, adaptations, and alternatives can occur to one skilled in the art without departing from the spirit and scope herein.

What is claimed is:

1. An electrolyte comprising:
a lithium salt;
a first ether of formula I-63:

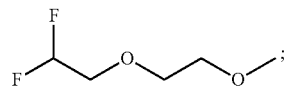

I-63

TABLE

| Examples | Solvent 1 | Solvent 2 | Solvent 1 to Solvent 2 volume ratio | Ionic conductivity (mS/cm) | Cycle life |
| --- | --- | --- | --- | --- | --- |
| Ex 1 * | DEE | — | — | 6.2 | 5 |
| Ex 2 * (FIG. 1) | DEE | TTE | 40:60 | 3.0 | 48 |
| Ex 3 * | DEE | 1,2-bis(1,1,2,2-tetrafluoroethoxy)ethane | 40:60 | 2.3 | 35 |
| Ex 4 * | I-40 (F2EE) | — | — | 4.1 | 7 |
| Ex 5 | I-40 (F2EE) | TTE | 70:30 | 3.7 | 30 |
| Ex 6 | I-40 (F2EE) | TTE | 60:40 | 3.4 | 42 |
| Ex 7 (FIG. 2) | I-40 (F2EE) | TTE | 50:50 | 2.9 | 54 |
| Ex 8 | I-40 (F2EE) | TTE | 40:60 | 2.7 | 72 |
| Ex 9 (FG. 3) | I-40 (F2EE) | TTE | 30:70 | 1.8 | 79 |
| Ex 10 * (FIG. 4) | I-55 (FDMPr) | — | — | 6.2 | 21 |
| Ex 11 (FIG. 5) | I-55 (FDMPr) | TTE | 50:50 | 4.8 | 45 |
| Ex 12 (FIG. 6) | I-56 (FDEPr) | TTE | 40:60 | 1.1 | 61 |
| Ex 13 * (FIG. 7) | I-63 (F2ME) | — | — | 4.9 | 5 |
| Ex 14 (FIG. 8) | I-63 (F2ME) | TTE | 50:50 | 3.5 | 52 |
| Ex 15 | I-63 (F2ME) | TTE | 40:60 | 2.5 | 69 |
| Ex 16 (FIG. 9) | I-63 (F2ME) | TTE | 30:70 | 2.1 | 81 |
| Ex 17 * | I-64 (F3ME) | — | — | 3.3 | 11 |
| Ex 18 | I-64 (F3ME) | TTE | 70:30 | 3.1 | 22 |
| Ex 19 | I-64 (F3ME) | TTE | 60:40 | 2.9 | 43 |
| Ex 20 (FIG. 10) | I-64 (F3ME) | TTE | 50:50 | 2.6 | 58 |
| Ex 21 | I-64 (F3ME) | TTE | 40:60 | 2.1 | 68 |
| Ex 22 (FIG. 11) | I-64 (F3ME) | TTE | 30:70 | 1.3 | 77 |
| Ex 23 (FIG. 12) | I-63 | TTE | 50:50 | 3.5 | 133 |
| Ex 24 (FIG. 13) | I-63 | TTE | 40:60 | 2.5 | 255 |
| Ex 25 (FIG. 14) | I-40 | TTE | 40:60 | 2.7 | 185 |
| Ex 26 * | 1,2-bis(1,1,2,2-tetrafluoroethoxy)ethane | — | — | 2M LiFSI insoluble | — |

* Comparative examples

The data shows that adding TTE to a fluorinated diether with a limited degree of fluorination slightly reduces ionic conductivity and greatly improves cycle life. Without wishing to be bound by theory, it is believed that adding TTE facilitates the formation of an anion-derived SEI (solid electrolyte interface), which is beneficial for suppressing side reactions between lithium metal and the electrolytes.

As compared to adding TTE to a nonfluorinated ether (DEE), adding TTE to a fluorinated diether with a limited degree of fluorination still lowers the conductivity but at a and
a second ether consisting of 1,1,2,2-tetrafluoroethyl-2,2,3,3-tetrafluoropropylether,
wherein a volume ratio of the first ether to the second ether is 70:30 to 30:70, based on a total volume of the first ether and the second ether.

2. The electrolyte of claim 1, wherein the volume ratio of the first ether to the second ether is 60:40 to 30:70, based on a total volume of the first ether and the second ether.

3. The electrolyte of claim 2, wherein the volume ratio of the first ether to the second ether is 50:50 to 40:60, based on a total volume of the first ether and the second ether.

4. The electrolyte of claim 1, wherein the volume ratio of the first ether to the second ether is 60:40 to 40:60.

5. The electrolyte of claim 1, wherein a sum of a weight of the first ether and a weight of the second ether is 60 wt. % to 95 wt. %, based on a total weight of the electrolyte.

6. The electrolyte of claim 1, wherein a sum of a weight of the first ether and a weight of the second ether is 75 wt. % to 95 wt. %, based on a total weight of the electrolyte.

7. The electrolyte of claim 1, wherein the lithium salt is a lithium imide salt.

8. An electrochemical cell comprising:
an anode;
a cathode; and
the electrolyte of claim 1.

9. The electrochemical cell of claim 8, wherein the anode comprises at least one of silicon, silicon deposited on carbon, silicon monoxide, a graphite-silicon composite, a graphite-silicon monoxide composite, a graphite-silicon nitride composite, or a graphite-silicon carbide composite.

10. The electrochemical cell of claim 8, wherein the anode comprises a current collector, and the electrochemical cell is an anode-free lithium battery.

11. The electrochemical cell of claim 10, wherein the anode does not comprise an anode active material on the current collector.

12. A method of preparing an electrochemical cell, the method comprising:
providing the electrolyte of claim 1, and
adding the electrolyte to an assembly comprising a cathode and an anode, to facture the electrochemical cell.

* * * * *